(12) United States Patent
Cetiner et al.

(10) Patent No.: US 7,469,152 B2
(45) Date of Patent: Dec. 23, 2008

(54) METHOD AND APPARATUS FOR AN ADAPTIVE MULTIPLE-INPUT MULTIPLE-OUTPUT (MIMO) WIRELESS COMMUNICATIONS SYSTEMS

(75) Inventors: Bedri A. Cetiner, Morehead, KY (US); Hamid Jafarkhani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 469 days.

(21) Appl. No.: 11/286,803

(22) Filed: Nov. 22, 2005

(65) Prior Publication Data
US 2006/0222101 A1    Oct. 5, 2006

Related U.S. Application Data

(60) Provisional application No. 60/632,111, filed on Nov. 30, 2004.

(51) Int. Cl.
*H04M 1/00* (2006.01)
*H04J 3/00* (2006.01)

(52) U.S. Cl. ............... 455/562.1; 455/25; 455/13.3; 455/63.4; 455/575.7; 455/101; 370/310; 370/314; 370/330; 370/323; 370/345

(58) Field of Classification Search ............ 455/562.1, 455/25, 13.3, 63.4, 575.7, 101, 561
See application file for complete search history.

(56) References Cited

U.S. PATENT DOCUMENTS

| | | | |
|---|---|---|---|
| 6,417,807 B1 * | 7/2002 | Hsu et al. | 343/700 MS |
| 2002/0131516 A1 * | 9/2002 | El-Gamal et al. | 375/285 |
| 2002/0132600 A1 * | 9/2002 | Rudrapatna | 455/277.1 |
| 2006/0030364 A1 * | 2/2006 | Olesen et al. | 455/562.1 |
| 2006/0034244 A1 * | 2/2006 | Huang et al. | 370/344 |
| 2006/0039312 A1 * | 2/2006 | Walton et al. | 370/319 |

* cited by examiner

*Primary Examiner*—Alexander Eisen
*Assistant Examiner*—Huy Q Phan
(74) *Attorney, Agent, or Firm*—Daniel L. Dawes

(57) ABSTRACT

An adaptive MIMO communications system includes a multifunctional reconfigurable antenna with a selectively alterable effective physical antenna array configuration and radiation/polarization properties, which configuration and properties is a component in the optimization of the adaptive system parameters. The multifunctional reconfigurable antenna comprises a plurality of antenna components and a plurality of selectively controllable switches coupling selected ones of the plurality of antenna components together into a multifunctional reconfigurable subarray of antenna components. A processing unit coupled to the multifunctional reconfigurable antenna determines communication channel conditions for generating adaptive control signals to the plurality of selectively controllable switches to selectively apply a selected space-time coding protocol or a selected beam forming protocol together on the plurality of antenna components depending on channel conditions.

56 Claims, 15 Drawing Sheets

METHOD AND APPARATUS FOR AN ADAPTIVE MULTIPLE-INPUT MULTIPLE-OUTPUT (MIMO) WIRELESS COMMUNICATIONS SYSTEMS

RELATED APPLICATIONS

The present application is related to U.S. Provisional Patent Application Ser. No. 60/632,111, filed on Nov. 30, 2004, which is incorporated herein by reference and to which priority is claimed pursuant to 35 USC 119.

GOVERNMENT RIGHTS

This invention was supported in part by the Defense Advanced Research Projects Agency (DARPA) under grant MDA 972-03-C-0017, the US Air Force under grant F04611-03-C-004, and the National Science Foundation (NSF) under grant ECS-0424454. The Government has certain rights to the invention.

BACKGROUND OF THE INVENTION

1. Field of the Invention

The invention relates to the field of adaptive multiple-input multiple-output (MIMO) communications system equipped with multifunction reconfigurable antennas and adaptive coding schemes.

2. Description of the Prior Art

There has recently been significant research performed on MIMO systems with associated technologies such as smart antennas and adaptive coding and modulation techniques, which have been proven to dramatically increase the wireless channel capacity and improve the diversity. Making the best use of limited and costly wireless bandwidth is the main motivation behind these efforts. Although in these studies considerable attention has been given to the performance analysis of these systems in the context of coding and signal processing architectures, the investigation of the antenna aspect is limited to the impact of the number of antennas with little consideration of their radiation and polarization characteristics, and array geometry.

Much has been written in the current literature on MIMO systems, and the associated transmission algorithms such as space-time codes (STCs) and spatial multiplexing (SM). Spatial multiplexing is a multiplexing scheme whereby different bits are transmitted from different antennae and in independent communication channels. The common goal of these research efforts is to make the best use of limited and costly wireless bandwidths by exploiting high spectral efficiencies offered by multiple antenna systems. Although in these studies considerable attention has been given to the performance analysis of these systems in the context of coding and signal processing architectures, the investigation of the antenna aspect is mainly limited to the impact of the number of antenna elements with little consideration on their radiation and polarization characteristics as well as array geometry.

The achievable MIMO capacities are highly dependent on the channel matrix properties, which, in return, are determined by joint and/or separate roles of all parameters involved. These parameters are the physical structure of the channel (scattering density and disposition of the scatterers), the MIMO algorithms (coding and signal processing schemes), and the antenna array configuration with its radiation/polarization properties. The mobility and time varying nature of wireless communications increase the interactions among these parameters and their joint roles become key in realizing theoretical gains of MIMO systems.

Adaptive MIMO systems that take advantage of varying channel conditions are of particular interest in this study. In an adaptive system, the system parameters are jointly optimized to adapt to the changing channel conditions through link adaptation techniques that can track the time-varying characteristics of the wireless channel.

The adjustable system parameters recognized in the prior art are identified as the modulation level, coding rate, and transmission-signaling schemes such as spatial multiplexing, space-time coding, and beam forming. The antenna properties of this system are fixed by initial design thereby cannot be changed. In other words today's adaptive MIMO systems are constrained to employ a fixed antenna design over varying channel conditions.

What is needed is some kind of method and means to maximize the resources available in multiple antenna channels by using optimal schemes at all times.

BRIEF SUMMARY OF THE INVENTION

It is the realization of the invention that there is additional room for further exploitation of the theoretical gains of MIMO systems when the antenna/electromagnetic aspects and the associated signal processing and coding aspects are integrated together in a multidisciplinary approach. The adaptation algorithm must be able to select the best combination of the system parameters with respect to the properties of instantaneous or averaged space-time channel matrix in a continuous way.

In this disclosure, the adaptive process introduces an additional degree of freedom by treating the antenna array configuration and its radiation/polarization and frequency properties as an additional component in the joint optimization of the adaptive system parameters.

We identify interrelationships among transmission-signaling schemes, physical channel conditions, and antenna radiation/polarization properties so that the best antenna design for a given transmission scheme and/or channel condition is always selected. This allows the system to approach the theoretical spectral efficiencies offered by a MIMO design. The object of joint optimization of antenna array characteristics and the associated transmission algorithm can only be achieved if each individual element of the array can be dynamically reconfigured in its structural geometry, what will be hereinafter referred to as multifunctional reconfigurable antennas. A reconfigurable antenna alters its radiation/polarization and frequency properties by altering or morphing its physical structure. The reconfigurable antenna concept in this study is fundamentally different from the concept of smart antennas in the literature.

The object of the illustrated embodiment of the invention is to respond, in a most effective way, to the changes in the propagation environment with rapidly changing multipath conditions by enhancing the adaptability features of current adaptive MIMO systems, thereby improving dramatically the performance characteristics of the system.

The fundamental principle of the illustrated embodiment of the invention is to treat antenna properties (radiation pattern, operating frequency, polarization) and antenna array configuration as additional components in the joint optimization of the adaptive system parameters. Since our system employs multifunction reconfigurable antennas, the antenna properties can be dynamically changed and jointly optimized with adaptive transmission signaling schemes such as i.e. beam forming, space-time coding, or spatial multiplexing.

By employing reconfigurable antenna elements as opposed to classical antenna elements, the selection of the best antenna properties and configuration in conjunction with the adapted transmission scheme with respect to the channel condition becomes possible. This feature improves system performance characteristics.

Being able to change antenna properties, i.e. radiation pattern, polarization, operating frequency, enables to shape the characteristics of the propagation environment for the advantage of the transmission signaling schemes so that the best combination of system parameters are always selected. Conventional MIMO systems are constrained to employ fixed antenna properties, which are determined by the initial antenna design, over the varying channel condition. Thus, non-reconfigurable antenna designs are have none of the above advantages.

The invention has a wide variety of commercial and military uses in wireless communication applications, in particular for use in environments with rapidly changing multipath conditions. Multiuser wireless networks such as cellular mobile communication systems (3G, 4G), wireless local area networks (Wi-Fi, 802.11a/b/g, WLAN) and many other applications such as mission-centric and/or individual-centric implementations of wireless ad-hoc networks, and/or sensor networks are typical examples of applications. One particular example for commercial use is the forthcoming very high performance IEEE communications standard, IEEE 802.11n. With our invention the performances of this standard can be further improved. The invention will impact the next generation standards, particular in the wireless communications market.

Thus, the illustrated embodiment of the invention can be characterized as an improvement in an adaptive MIMO communications system comprising a multifunction reconfigurable antenna with a selectively alterable effective physical antenna array configuration and radiation/polarization properties, which configuration and properties is a component in the optimization of the adaptive system parameters.

The reconfigurable antenna comprises a plurality of antenna components of any geometric shape and a plurality of selectively controllable switches coupling selected ones of the plurality of antenna components together into a reconfigurable subarray of antenna components.

The improvement further comprises a processing unit coupled to the reconfigurable antenna to determine communication channel conditions for generating adaptive control signals to the plurality of selectively controllable switches.

The processing unit generates adaptive control signals to the plurality of selectively controllable switches to apply a selected beam forming protocol on the plurality of antenna components.

The processing unit generates adaptive control signals to the plurality of selectively controllable switches to apply a selected space-time coding protocol on the plurality of antenna components.

The processing unit generates adaptive control signals to the plurality of selectively controllable switches to selectively apply a selected space-time coding protocol, spatial multiplexing or a selected beam forming protocol together on the plurality of antenna components depending on channel conditions.

The processing unit generates adaptive control signals to the plurality of selectively controllable switches to apply a selected radiation/polarization protocol on the plurality of antenna components according to transmission scheme or channel condition.

The processing unit generates adaptive control signals to the plurality of selectively controllable switches to apply a selected optimized radiation/polarization protocol on the plurality of antenna components according to transmission scheme and channel condition.

The processing unit generates adaptive control signals to the plurality of selectively controllable switches to dynamically reconfigure the structural geometry of the antenna.

The processing unit generates adaptive control signals to the plurality of selectively controllable switches to alter the frequency characteristics of the antenna.

The processing unit generates adaptive control signals to the plurality of selectively controllable switches to dynamically reconfigure the antenna radiation/polarization and frequency characteristics by altering the physical structure of the antenna.

The processing unit generates adaptive control signals to the plurality of selectively controllable switches to dynamically alter the antenna to optimally respond to changes in the propagation environment with changing multipath conditions.

The improvement is used in combination with multiuser wireless networks including cellular mobile communication systems, wireless local area networks, mission-centric or individual-centric implementations of wireless ad-hoc networks, or sensor networks.

The processing unit generates adaptive control signals to the plurality of selectively controllable switches to selectively alter the array factor and the element factor of the reconfigurable antenna.

The improvement further comprises a plurality of multifunction reconfigurable antennas selectively arranged and configured into a reconfigurable antenna array.

The processing unit generates adaptive control signals to the plurality of selectively controllable switches to selectively interrelate transmission algorithms, radiation/polarization characteristics of the reconfigurable antenna, configuration of the reconfigurable antenna, and propagation environment to optimize communication performance at all times.

The processing unit generates adaptive control signals to the plurality of selectively controllable switches to selectively determine the number of antenna elements communicated to a corresponding transmission algorithm.

The processing unit generates adaptive control signals to the plurality of selectively controllable switches to utilize available partial channel information to dynamically change antenna behavior and provide the optimal performance in all cases to converge to space-time coding when the transmitter does not know the channel at all and to converge to beam forming when the transmitter knows the channel perfectly.

The processing unit generates adaptive control signals to vary antenna element separation with geometric reconfigurability in the antenna.

The processing unit generates adaptive control signals to alter operating frequency for space-frequency coding in MIMO-orthogonal frequency-division multiplexing (MIMO-OFDM).

The improvement further comprises a common substrate and the switches comprise RF MEMS switches monolithically integrated on the common substrate with the antenna. The common substrate comprises a microwave laminate printed circuit board or at least comprises a printed circuit board compatible with RF MEMS technology.

The switch comprises an RF-MEM actuator and where the antenna components comprise pixels patches in which two adjacent pixel patches are interconnected by the RF-MEM actuator and are arranged a pixel-patch antenna array. The RF-MEM actuator comprises a conductive movable membrane suspended over opposing and unconnected conductive stubs extending from adjacent pixel-patches in the array, so that when a voltage is applied between the membrane and the stub an electromagnetic force moves the suspended membrane into one of two electrical conduction states with the stub to selectively connect or disconnect the pixel-patches.

The improvement further comprises a reconfigurable feed circuit coupled to the antenna which is selectively controllable to dynamically match the antenna impedance depending on the modes of operation of the antenna. The reconfigurable feed circuit comprises at least two selectively controllable radial stubs and a selectively controllable quarter-wave transformer.

The processing unit is coupled to the reconfigurable feed circuit to connect selected ones of the stubs and to selectively control the selectively connected radial stubs and quarter-wave transformer to achieve desired impedance matching for a targeted mode of operation.

The processing unit generates adaptive control signals according to reconfigurable modes of operation characterized by a selected one or ones of a plurality of operating frequencies and characterized by a selected one or ones of a plurality of reconfigurable polarizations of the radiated field.

The implementation of reconfigurable modes of operation characterized by a selected one or ones of a plurality of operating frequencies is achieved by changing the architecture of the antenna.

The illustrated embodiment also includes an improvement in a method of operating an adaptive MIMO communications system according to any one of the foregoing descriptions.

In particular, the illustrated embodiment is an improvement in a method of optimizing operation of an adaptive MIMO communications system comprising operating a plurality of multifunction reconfigurable antennas to introduce an additional degree of freedom by treating the physical antenna array configuration and its radiation/polarization and frequency properties as adaptive system parameters.

The illustrated embodiment is an improvement in a method of operating an adaptive MIMO communications system comprising operating a plurality of multifunction reconfigurable antennas according to a plurality of adaptive coding schemes to optimally respond to the changes in the propagation environment with rapidly changing multipath conditions in which reconfiguration of antenna properties and array configuration is dynamically combined with selection of the adaptive coding scheme to provide an optimal communication. The step of operating a plurality of multifunction reconfigurable antennas comprises: jointly optimizing communication by beam forming, or space-time coding, spatial multiplexing or any other transmission signaling scheme; or selecting the properties and array configuration as additional components in a joint optimization of the adaptive system by selecting parameters of the antenna properties and configuration in conjunction with an adapted transmission scheme with respect to the channel condition.

The step of selecting parameters of the antenna properties and configuration in conjunction with an adapted transmission scheme with respect to the channel condition comprises changing antenna properties, such as radiation pattern, polarization, operating frequency, to shape the characteristics of the propagation environment for the advantage of the transmission signaling schemes so that an optimal combination of system parameters are dynamically selected.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like components are referenced by like numerals.

BRIEF DESCRIPTION OF THE DRAWINGS

FIG. 2b is a top view of one of the RF MEMS actuators of FIG. 2a.

Figure 1A:
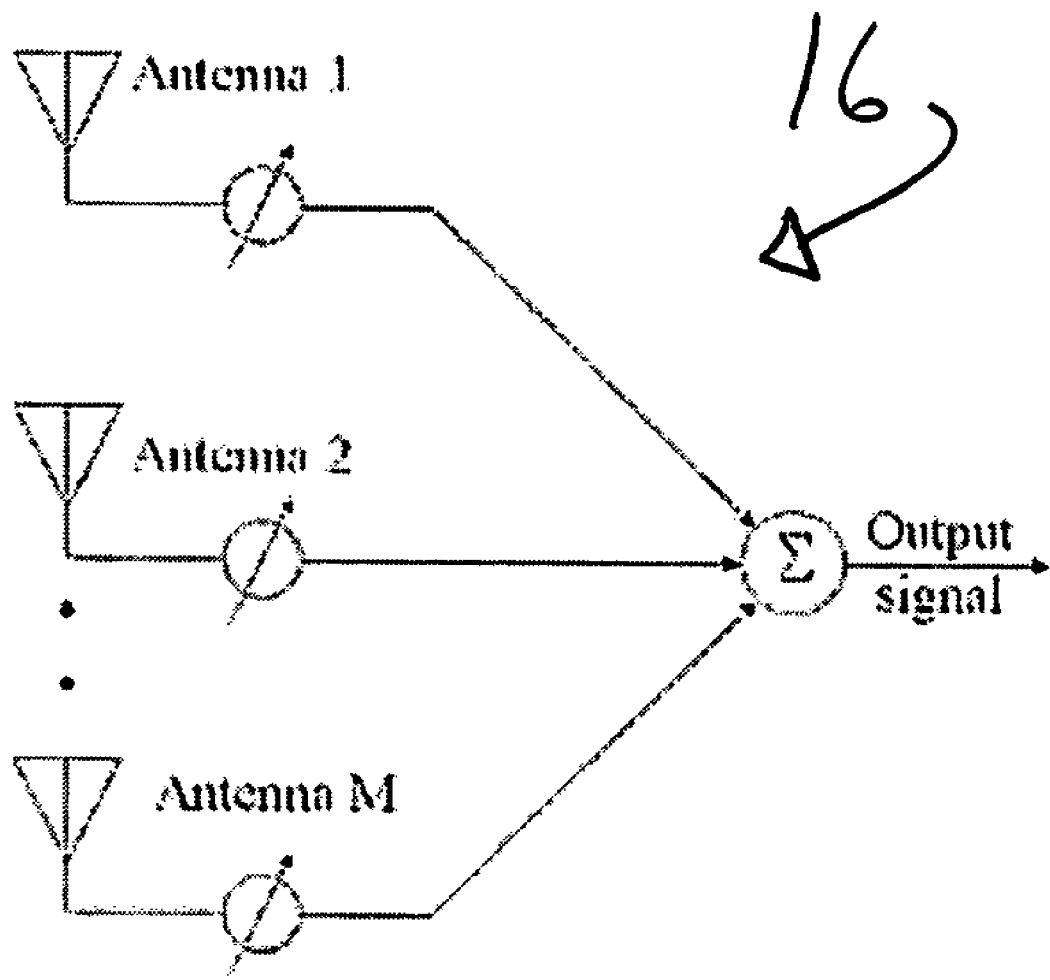
FIG. 1a is a block diagram of conventional smart antenna array.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Multi-input multi-output (MIMO) systems with associated technologies such as smart antennas and adaptive coding and modulation techniques enhance channel capacity, diversity, and robustness of wireless communications as has been proven by many recent research results both theoretically and experimentally. This disclosure focuses on the antenna aspect of MIMO systems 10. In particular, we disclose the important role of the multifunctional reconfigurable antenna 12 and its links with space-time coding techniques that can be employed for further exploitation of the theoretical performance of MIMO wireless systems 10.

The advantages of the multifunctional reconfigurable antenna 12 compared to the conventional smart antenna are discussed below. Establishment of multifunctional reconfigurable antennas 12 requires novel radio frequency microelectromechnical systems (RF MEMS) technology, which we have developed. We disclose this technology with emphasis on its distinct advantages over existing silicon-based MEMS technologies for multifunctional reconfigurable antennas 12. A multifunctional reconfigurable antenna design that can change its operating frequency and radiation/polarization characteristics is disclosed. Finally, we present experimental and theoretical results from impedance and radiation performance characterization for different antenna configurations.

Turn now to the concept of a multifunctional reconfigurable antenna 12 and its potential impact on MIMO systems 10. In the literature, a smart, intelligent, or adaptive antenna refers to an antenna array of elements that are typically standard monopoles, dipoles, or patches. The antenna elements themselves do not posses any intelligence. The intelligence is performed in the signal-processing domain where the time domain signals from or to the individual antenna elements are weighted and combined in a way that the resulting radiation pattern, i.e. the spatial response of the array, satisfies some type of determined conditions. This is the key concept of beam forming through which the electromagnetic energy is focused in the direction of the desired signal while a null placed in the direction of noise or interference sources.

On the other hand, a multifunctional reconfigurable antenna array 14 is comprised of antenna elements 12 each of which has some intelligence. This intelligence stems from the ability of reconfiguring the physical structure of individual elements through which polarization/radiation and frequency properties of the array 14 are changed. The elements in the multifunctional reconfigurable antenna array 14 have the ability to intelligently process the signals in spectral and angular domains adding to the already present time domain processing of the system 10. In the language of phased-array antennas, a multifunctional reconfigurable antenna array 14 does not only alter the array factor but also the element factor. In current phased-array technology, the element factor cannot be modified once individual elements are laid out.

Figure 1B:
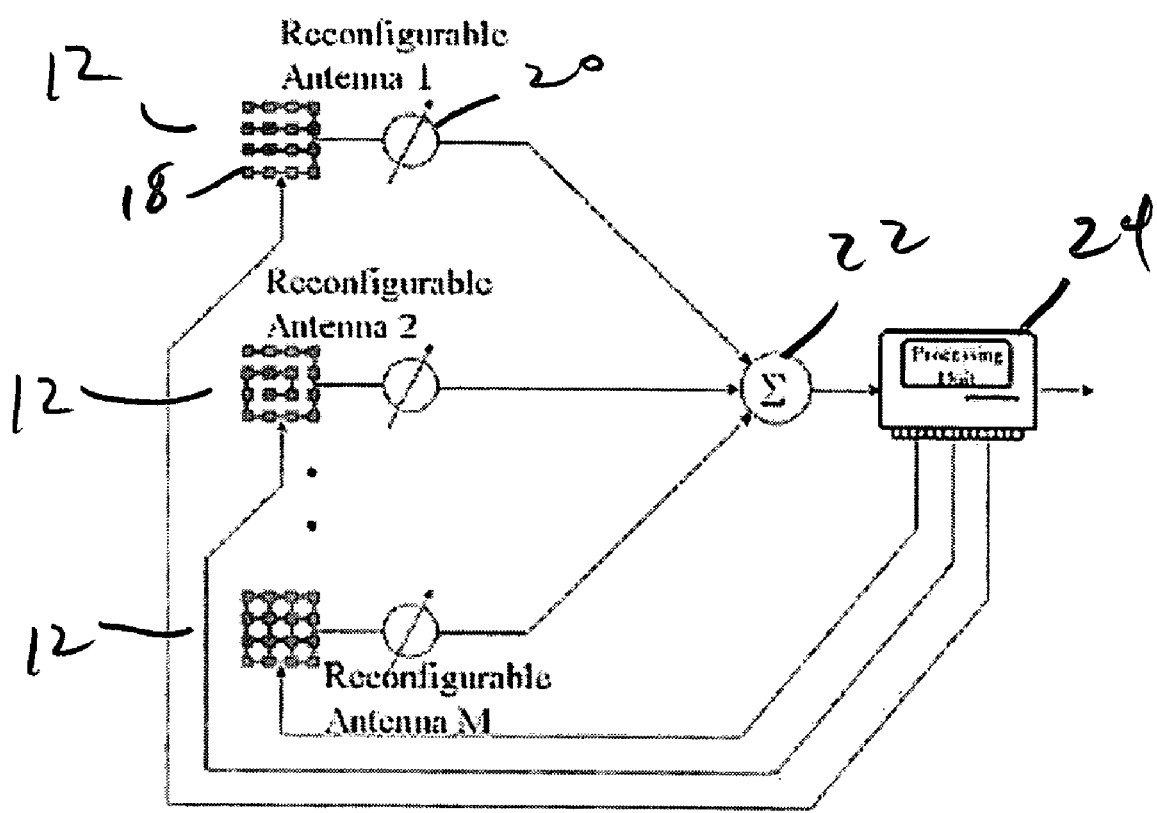
FIG. 1b is a block diagram of a multifunctional reconfigurable antenna array according to the invention.

FIGS. 1a-1b are block diagrams of a conventional smart antenna array 16 and a multifunctional reconfigurable antenna array 14, respectively. Multifunctional reconfigurable antennas 12 having elements 18 include an intelligent control means 20 for altering the array factor and element factor. Antenna 12 is coupled to a summing circuit 22 whose output in turn is coupled to a processing unit 24, which feedback to antennas 12 to provide for reconfiguration of array 14 and antennas 12 as described below. Processing unit 24 may be a general purpose or special purpose computer controlled by software or firmware, or may be a digital or analog signal processing or logic circuit. The means by which such circuits can be designed, configured or programmed to perform the functions disclosed in this specification according to the invention are conventional.

In a multifunctional reconfigurable array 14, the antenna element spacing can also be changed allowing efficient selection, application of beam forming and space-time coding schemes. While beam forming requires antennas to be closely spaced (antennas are correlated) to avoid the negative effects of side lobes, space-time coding will perform well if the spacing between antennas is large enough to ensure low correlation. As a result, a MIMO system 10 with reconfigurability in the geometrical domain of antenna will not be constrained to use the same antenna design over varying channel conditions, which results in better utilization of the available channel capacity.

Finally, a multifunctional reconfigurable antenna 12 is also advantageous in terms of antenna real estate. In today's miniature, compact, and highly integrated telecommunication devices the area devoted to antenna elements 12 is typically very limited. This has prompted antenna community to actively research small efficient antenna design. However, the performances of an antenna (gain, bandwidth, efficiency) of a given electrical size are governed by laws of electromagnetism that dictate the fact that the smaller the size of an antenna the lower the performance. In other words, in designing a small size antenna there is always a compromise among size, bandwidth, and efficiency. Multifunctional reconfigurable antenna architecture, on the other hand, makes very efficient use of limited area by taking advantage of combined multiple functions in one single antenna 12. This results in significant reduction in the area occupied by the multiple antenna elements 12 with enhanced functionality and performances.

Turn to consider links among transmission algorithms, radiation and/or polarization characteristics and configuration of the antenna array 14, and the environment. Here, we identify relationships among the transmission algorithms, the radiation/polarization characteristics and the configuration of the multifunctional reconfigurable antenna 12, and the propagation environment. These relationships enable the joint adjustment of the characteristics of the multifunctional reconfigurable antenna array 14 and the coding schemes over varying channel conditions to optimize communication performance at all times.

Number of Antenna Components:

The most basic relationship, which does not require reconfigurability in the geometrical domain of the multiple antennas 12, relates the number of antenna elements 18 to a specific transmission algorithm. For multiple antennas 12 if the number of transmit antennas 12 is larger than two then it is not possible to design orthogonal space-time block codes (ST-BCs). Space-time block coding is a technique used in wireless communications to transmit multiple copies of a data stream across a number of antennas and to exploit the various received versions of the data to improve the reliability of data-transfer. The fact that transmitted data must traverse a potentially difficult environment with scattering, reflection, refraction and so on as well as be corrupted by thermal noise in the receiver means that some of the received copies of the data will "better" than others. This redundancy results in a higher chance of being able to use one or more of the received copies of the data to correctly decode the received signal. In fact, space-time coding combines all the copies of the received signal in an optimal way to extract as much information from each of them as possible. Space-time block codings as originally introduced, and as usually studied, are orthogonal. This means that the space-time block coding is designed such that the vectors representing any pair of columns taken from the coding matrix are orthogonal. The result of this is simple, linear, optimal decoding at the receiver. Its most serious disadvantage is that all but one of the codes that satisfy this criterion must sacrifice some proportion of their data rate. There are also space-time block coding designs that allows some inter-symbol interference, but can achieve a higher data rate, and even a better error-rate performance, in harsh conditions.

In case of more than two antennas 12, recently developed quasi-orthogonal space-time block codes have been used by others to achieve full rate and full diversity at the expense of slight increase in decoding complexity. For high signal-to-noise ratios (SNRs) and a very large number of antennas 12 spatial multiplexing is favorable over space-time block codes, since data rate of spatial multiplexing increases linearly with the increasing number of antennas 12 while diversity gain of space time code blocks will saturate.

2. Array Configuration and Polarization:

Besides the number of antenna elements 18, the subset of the elements selected in an array configuration is an important factor to achieve the majority of the capacity available in the channel. This does not only improve performance but also results in a MIMO system 10 with less complexity as the number of the transmit and receive RF chains are reduced. The performance can be further enhanced if the polarizations of the elements 18 are also taken into account as the propagation of the electric field for different polarizations differs depending on the environment. It has been shown experimentally that for a line-of-sight (LOS) indoor environment vertically polarized systems achieve higher capacity than horizontally polarized ones. Moreover an antenna array 14 with hybrid polarization, i.e. some elements are vertically polarized while others are horizontally polarized, perform better than single polarization systems for both line-of-sight and non-line-of-sight (NLOS) conditions.

In practical communication scenarios degenerate channel phenomena called the "keyhole channel" effect may arise where the antenna elements 18 both at the receiver and the transmitter have very low correlation due to rich scattering, and yet the channel matrix has a very low rank resulting in a single mode of communication. This shows that low correlation itself is not a guarantee for achieving high capacity. It has been shown in the art that in an outdoor propagation scenario the keyhole problem may be avoided by using horizontally oriented transmitter array instead of vertically oriented array. As a consequence, both the array configuration and the polarization of each individual element 18 need to be adaptive in order to maintain the channel performance over varying characteristics of the propagation environment.

A multifunctional reconfigurable antenna array 14 that can change its configuration and polarization has the characteristics necessary to adapt variable transmission/receiving environments.

Spatial and Polarization Antenna Diversity:

A compromise between data rate maximization and diversity maximization, i.e. choosing between spatial multiplexing and space time codes, is important in realizing MIMO gains since the performance of these signaling strategies is strongly dependent on time-varying channel characteristics. As is known spatial multiplexing performs particularly well in high SNR region, while space time code has better performance in a low SNR region. It has been shown in the art that while having multiple linear polarization diversity antennas at both ends of the link degrades the performance of space time code blocks in comparison to spatial diversity, significant improvements in the symbol error rate for a spatial multiplexing scheme are achieved in certain channel conditions such as in environments with high scattering density and with a high K-factor. The k-factor in ionospheric radio propagation is a correction factor that (a) is applied in calculations related to curved layers, and (b) is a function of distance and the real height of ionospheric reflection.

This leads to an important conclusion. A multifunctional reconfigurable antenna array 14 that can readily switch between polarization and spatial diversity schemes is needed to optimize an antenna performance for a given coding scheme, i.e., spatial multiplexing or space time code blocks, in a given channel environment.

4. Beam Forming, MIMO with Space Time Codes:

When only the receiver knows the channel, space-time codes achieve the maximum diversity in a system with multiple transmit antennas. On the other hand, if the transmitter knows the channel perfectly, beam forming is the optimal solution. In some practical cases, the transmitter has some but not perfect information about the channel, for example the mean or variance. When side information is available at the transmitter this information can be exploited to enhance the performance. Even when the channel information is based on poor channel estimation, the use of this information improves the performance of the system in combating fading.

The improvement can be achieved by combining space time codes and beam forming. Typically, when the quality of the channel feedback is high, the diversity rank is less critical and the transmitter should lay most energy on the "good" beam. On the other hand, when the feedback is unreliable, we should rely more on diversity and distribute energy evenly among different beams.

At the extreme case, when the channel feedback quality is so poor that it is entirely independent of the actual situation, the system becomes an open-loop system and the beam forming scheme should gradually fall back to non-beam formed conventional space-time coding. Therefore, the performance of the scheme should be similar to that of the original space-time code.

This requires the design of an adaptive system that can utilize the available partial channel information to change its behavior and provide the optimal performance in all cases. Such an adaptive system should converge to space-time coding when the transmitter does not know the channel at all and to beam forming when the transmitter knows the channel perfectly.

Performance can be improved further if the optimal array design is employed simultaneously. While antenna elements 18 are closely spaced and correlated in beam forming arrays, MIMO systems 10 employing space-time coding require large antenna spacing for uncorrelated antennas. It is also important to note that beam forming is more effective if the propagation environment has low scattering density, i.e., line of sight or near line of sight environment, resulting in fewer multipaths. The weight selection algorithms can be more easily optimized for a few multipaths than for many. In contrast, space-time codings take advantage of the multipath richness by maximizing data rate or diversity. The variation in antenna element separation would not be possible without geometric reconfigurability in the antennas.

Although not discussed above, a multifunctional reconfigurable antenna 12 can also change its operating frequency and may be useful for space-frequency coding in MIMO-orthogonal frequency-division multiplexing (MIMO-OFDM) systems.

Turn now and consider microwave laminate printed-circuit-board compatible RF MEMS technology. Before presenting the MEMS integrated multifunctional reconfigurable antenna design we give a brief overview of our MEMS technology, which offers some distinct advantages over existing MEMS technologies in establishing such systems. RF MEMS have created significant impact due to their potential of revolutionizing RF and microwave system implementation for the next generation of communication applications. In particular, RF MEMS switches have become very popular with their excellent switching characteristics, i.e., very low insertion loss, very low power requirements, and high isolation which cannot be attained by semiconductor switches.

The breakthrough potential of RF MEMS, however, is offset by the shortcomings of the real-world features of RF-MEMS devices. A single packaged RF MEMS switch, despite its much better switching performance, suffers from impedance mismatch issues when deployed in a circuit due to the distorting effects of the package interface. In addition the device-level packaging increases the cost per device, and its large format prohibits high densities of switches to be deployed in a single small-form-factor circuit.

The key advantage of RF MEMS can be realized according to the invention by system level implementation through monolithic integration capability with other circuit components. This capability is key, in particular, for creating multifunctional and multifunctional reconfigurable antenna systems. Realization of monolithic integration requires a common substrate for MEMS and antennas. However, microwave laminate printed circuit boards (PCBs) with desired electrical characteristics for antenna applications cannot be used by existing silicon-based MEMS technology owing to the process limitations imposed by printed circuit boards, such as low temperatures and non-planar surfaces. High permittivity materials such as Si and GaAs on which RF MEMS switches are currently fabricated are not a good choice for planar antennas due to the deleterious effects of surface waves and unacceptable losses. For this reason, a MEMS integrated multifunctional reconfigurable antenna fabricated by conventional technology cannot exploit monolithic integration.

We have recently developed a RF MEMS technology compatible with microwave laminate printed circuit boards that overcomes the drawbacks of the silicon-based MEMS technology in establishing multifunctional reconfigurable antennas with low cost and high performance. The breakthrough advantage of microwave laminate compatible RF MEMS technology lies in making possible RF MEM switches on virtually any laminates, plus monolithically integrating either single- or multi-layer antenna elements 18 with switches on this same substrate. Owing to the monolithic integration capability, MEMS becomes a physical part of the antenna 12, which is the key for a high degree of structural reconfigurability. System level packaging then allows for reduced cost and, by eliminating all wire bonds and most of the matching circuits, reduced loss, complexity, and size.

The details of printed circuit boards which are compatible with RF MEMS technology and the associated fabrication processes are published and known to those having ordinary skill in the art and are described generally in B. A. Cetiner, et. al. "Monolithic Integration of RF MEMS Switches With A Diversity Antenna on PCB Substrate" *IEEE Trans. Microwave Theory and Tech.*, vol. 51, no. 1, pp. 332-335, January 2003; and H. P. Chang et. al. "Low Cost RF MEMS Switches Fabricated on Microwave Laminate PCBs," *IEEE Electron Device Lett.*, vol. 24, no. 4, pp. 227-229, April 2003. Also see U.S. patent application Ser. No. 10/751,131, which is incorporated herein by reference.

Consider a multifunctional reconfigurable pixel-patch antenna array, working mechanism, and its results. Here we focus on the design and characterization of a single multifunctional reconfigurable antenna element 18 that can change its operating frequency and polarization. Its architecture also allows one to vary element separation in an antenna array 14. The radiation and impedance behaviors of the antenna 12 were characterized and compared to theory.

Figure 2A:
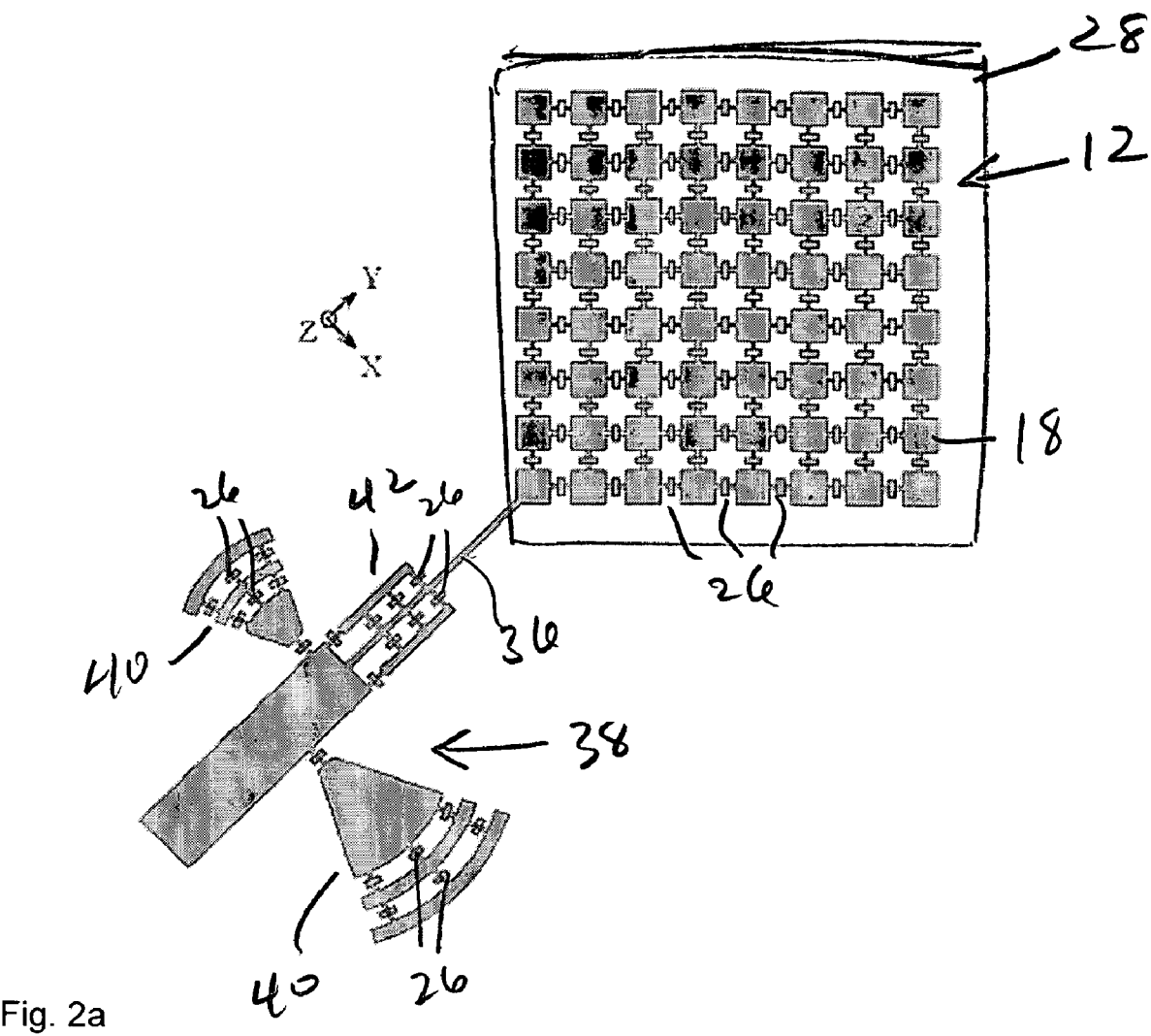
FIG. 2a is a schematic of a multifunctional reconfigurable pixel-patch antenna architecture using RF MEMS actuators.
Figure 2B:
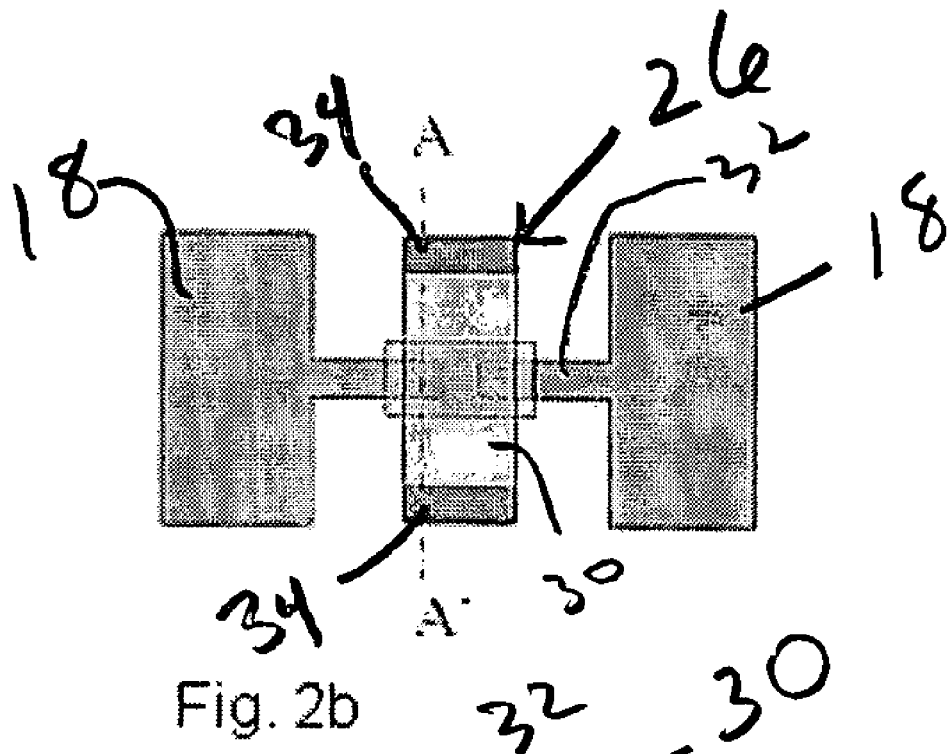
Figure 2C:
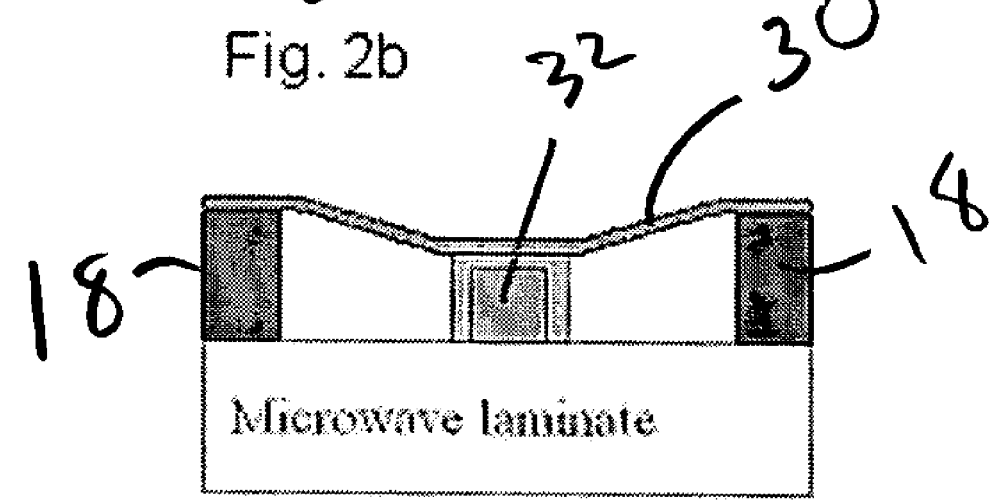
FIG. 2c is a side cross-sectional view one of the RF MEMS actuators of FIG. 2a shown in the down position.
Figure 2D:
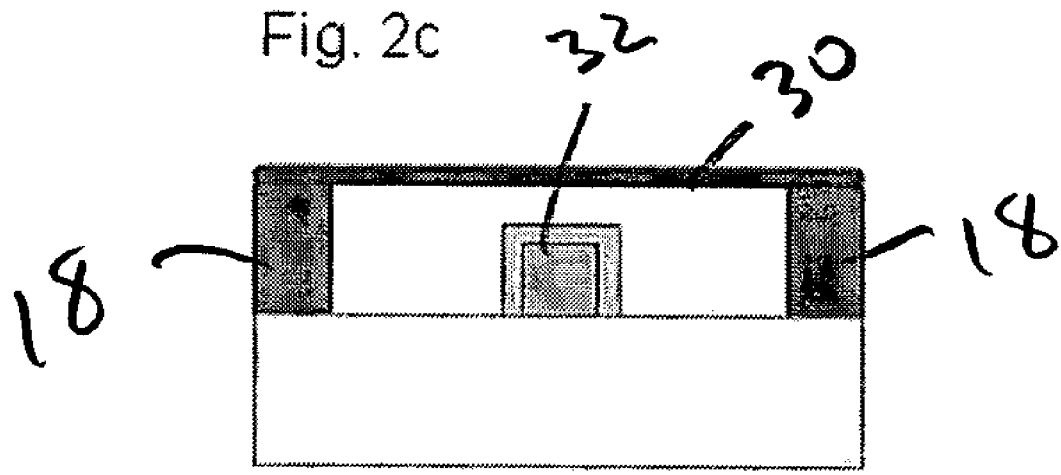
FIG. 2d is a side cross-sectional view one of the RF MEMS actuators of FIG. 2a shown in the up position.

Architecture and Working Mechanism:

Shown in FIG. 2a is the schematic of the proposed multifunctional reconfigurable pixel-patch antenna architecture. It is built on a number of printed rectangular shaped metallic pixels 18 interconnected by RF MEM actuators 26 on a microwave-laminated substrate 28. FIG. 2b shows the two adjacent pixels 18 interconnected by a RF-MEM actuator 26, which is made of a conductive or metallic movable membrane 30, suspended over opposing and unconnected conductive or metal stubs 32 extending from adjacent pixels 18 or strips of pixels 18, fixed to both ends through metallic posts 34. A DC bias voltage of approximately 50V applied between the membrane 30 and the stub 32 causes an electrostatic force that moves or pulls the suspended membrane 30 on top of the stub 32 to the actuator down state or actuator on, as diagrammatically depicted in FIG. 2c which is a cross-sectional view of FIG. 2a taken through section lines A-A'. The actuator 26 connects the pixels 18; otherwise pixels are disconnected (actuator up state or actuator off, as shown in the same cross-sectional view of FIG. 2d. Activation of the interconnecting actuators 26, i.e. by keeping some of the actuators 26 in the up position (zero bias) while activating the rest of them by applying DC bias voltages, allows modifying the geometry and changing the size through which multi-polarization and dual-frequency operation is achieved.

What has been illustrated is a normally open configuration where application of the voltage closes a normally open connection through membrane 30 between two adjacent stubs 32. However, it must be clearly understood that a normally closed configuration could be utilized with equal facility, where application of the voltage opens a normally closed connection through membrane 30 between two adjacent stubs 32. In addition, connection or disconnection between more than two stubs 32 could be employed if desired, such as might be used in non-raster arrays or in three-dimensional arrays in multi-level printed circuit boards for more complex array reconfigurations. Such extensions from the illustrated embodiment are expressly contemplated as being included within the scope of the invention.

The antenna 12 is fed by a microstrip 36 or any transmission line along its diagonal axis. This feed circuitry 38 is also multifunctionally reconfigurable since the input impedance of radiating element changes depending on the modes of operation, i.e. polarization states and operating frequencies.

We use a transmission line or microstrip feed line 36 with radial stubs 40 and quarter-wave transformer 42 as shown in FIG. 2a. The electrical lengths of the stubs 40 and transformer 42 are adjusted through activation/deactivation of MEM actuators 26 to achieve desired impedance matching for the targeted mode of operation. We also needed to use two stubs 40 since the stub location, in addition to its length, needs to be reconfigured depending on the operation scenario.

Multifunctional Reconfigurable Modes of Operation:

As shown in Table I, the antenna 12 of the illustrated embodiment provides ten different multifunctional reconfigurable modes of operation corresponding to the combination of two operating frequencies (4.1 GHz and 6.5 GHz) and five multifunctional reconfigurable polarizations of the radiated field (linear X, linear Y, dual linear, right hand circular, and left hand circular).

TABLE 1

Reconfigurable modes of operation

| | | Polarization | | | | |
|---|---|---|---|---|---|---|
| | | Dual Linear | Linear X | Linear Y | RHCP | LHCP |
| Frequency | Upper Frequency (6.4 GHz) | $Mode_{11}$ | $Mode_{12}$ | $Mode_{13}$ | $Mode_{14}$ | $Mode_{15}$ |
| | Lower Frequency (4.1 GHz) | $Mode_{21}$ | $Mode_{22}$ | $Mode_{23}$ | $Mode_{24}$ | $Mode_{25}$ |

Figure 3A:
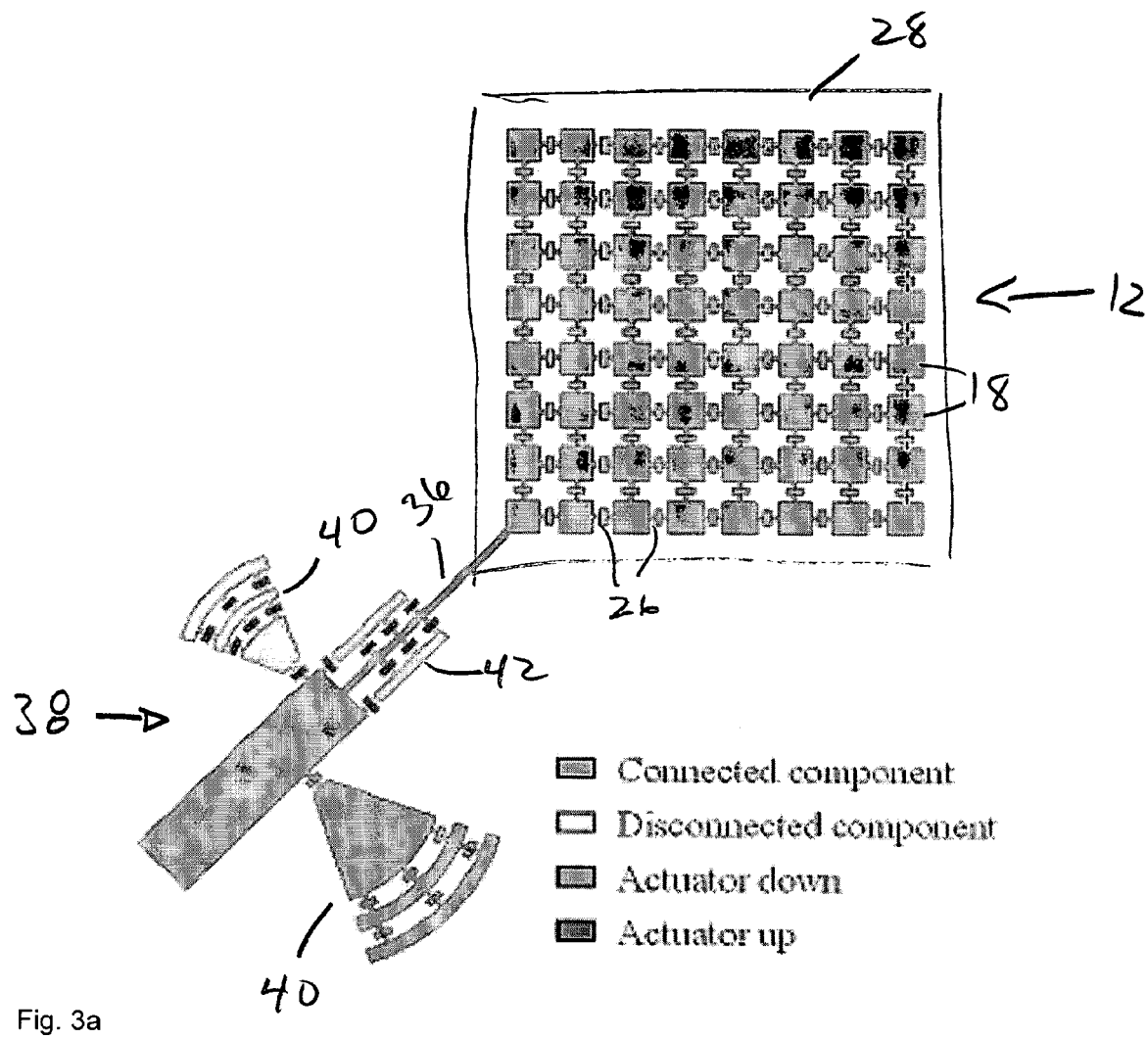
FIG. 3a is a schematic of a multifunctional reconfigurable pixel-patch antenna architecture arranged and configured for dual frequency operation at 4.1 GHz, $mode_{21}$ in Table I.
Figure 3B:
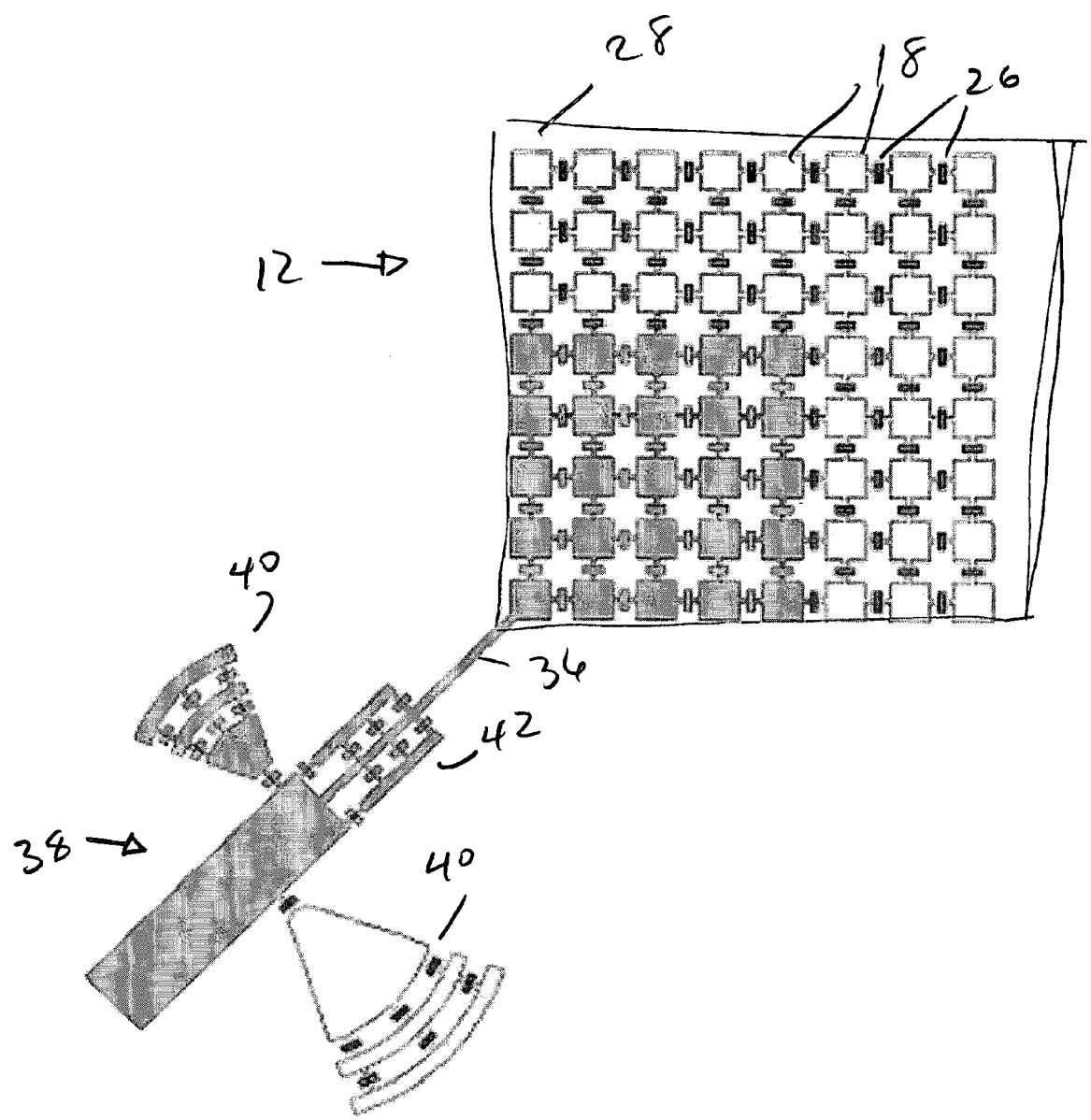
FIG. 3b is a schematic of a reconfigurable pixel-patch antenna architecture arranged and configured for dual frequency operation at 6.4 GHz, $mode_{11}$ in Table I.

Frequency reconfigurability is achieved by simply changing the size of the antenna 12. FIG. 3a and FIG. 3b show the schematics of dual frequency band operation, $mode_{11}$ and $mode_{21}$. The upper frequency (6.4 GHz) operation requires only 25 pixels to be connected as in FIG. 3b, whereas for lower frequency (4.1 GHz) all 64 pixels are connected as in FIG. 3a. Due to the diagonal feed circuitry, the antenna 12 radiates dual linearly polarized waves since pixels are connected both in X- and Y-direction as shown in FIGS. 3a and 3b.

Depending on the operating frequency the microstrip feed 36 is also reconfigured by adjusting the lengths of quarter-wave transformer 42 and matching stubs 40. Linear X- or linear Y-polarizations are obtained by connecting the pixels either only in X-direction or only in Y-direction, respectively.

Figure 4A:
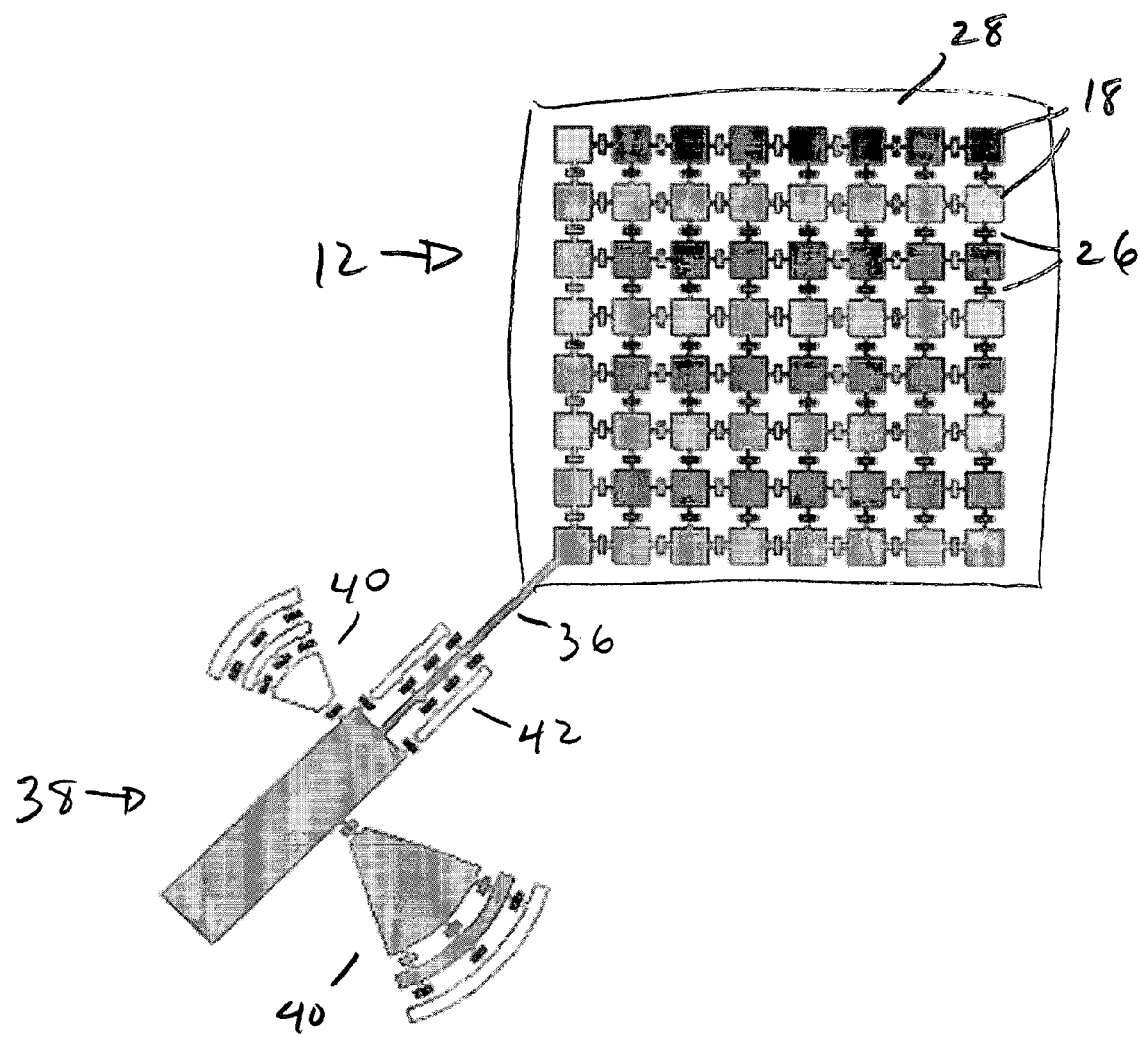
FIG. 4a is a schematic of a multifunctional reconfigurable pixel-patch antenna architecture arranged and configured for linear X polarization, $mode_{22}$ at 4.1 GHz in Table I.
Figure 4B:
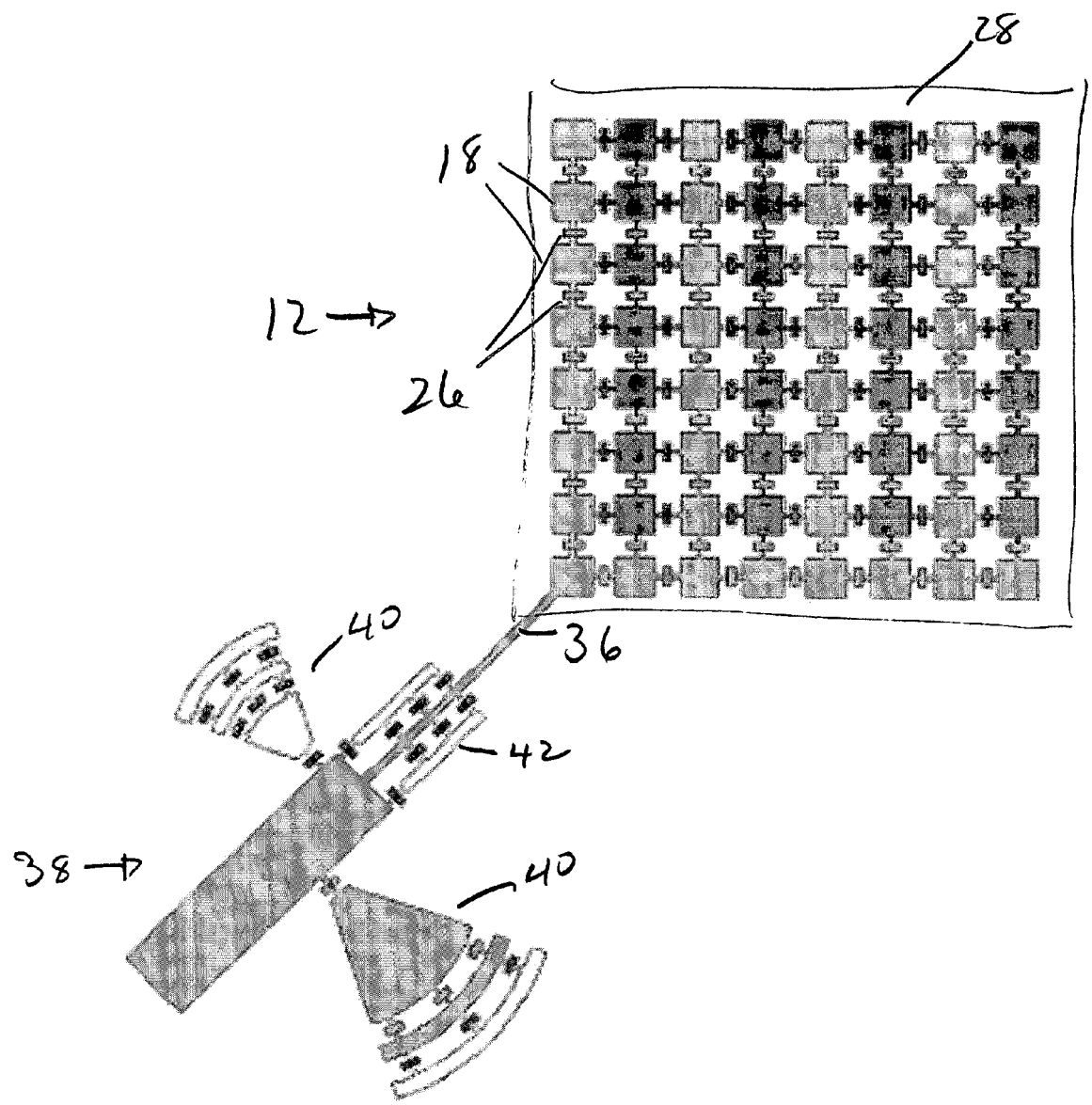
FIG. 4b is a schematic of a multifunctional reconfigurable pixel-patch antenna architecture arranged and configured for linear Y polarization, $mode_{23}$, at 4.1 GHz in Table I.

FIG. 4a and FIG. 4b show the two cases, $mode_{22}$ and $mode_{23}$, with required reconfiguration made in feed circuitry for lower operating frequency. To obtain circular polarizations we use the antenna geometries with internal slots 44 having proper dimensions and locations for a given operating frequency. Deactivation of specific MEM actuators introduces these internal slots 44 into the pixel-patch antenna geometry, which excites X and Y-polarized modes with equal amplitude and 90-degree phase difference. Accordingly right and left hand circularly polarized (RHCP and LHCP) radiation are achieved from each reconfigured geometry.

Figure 5A:
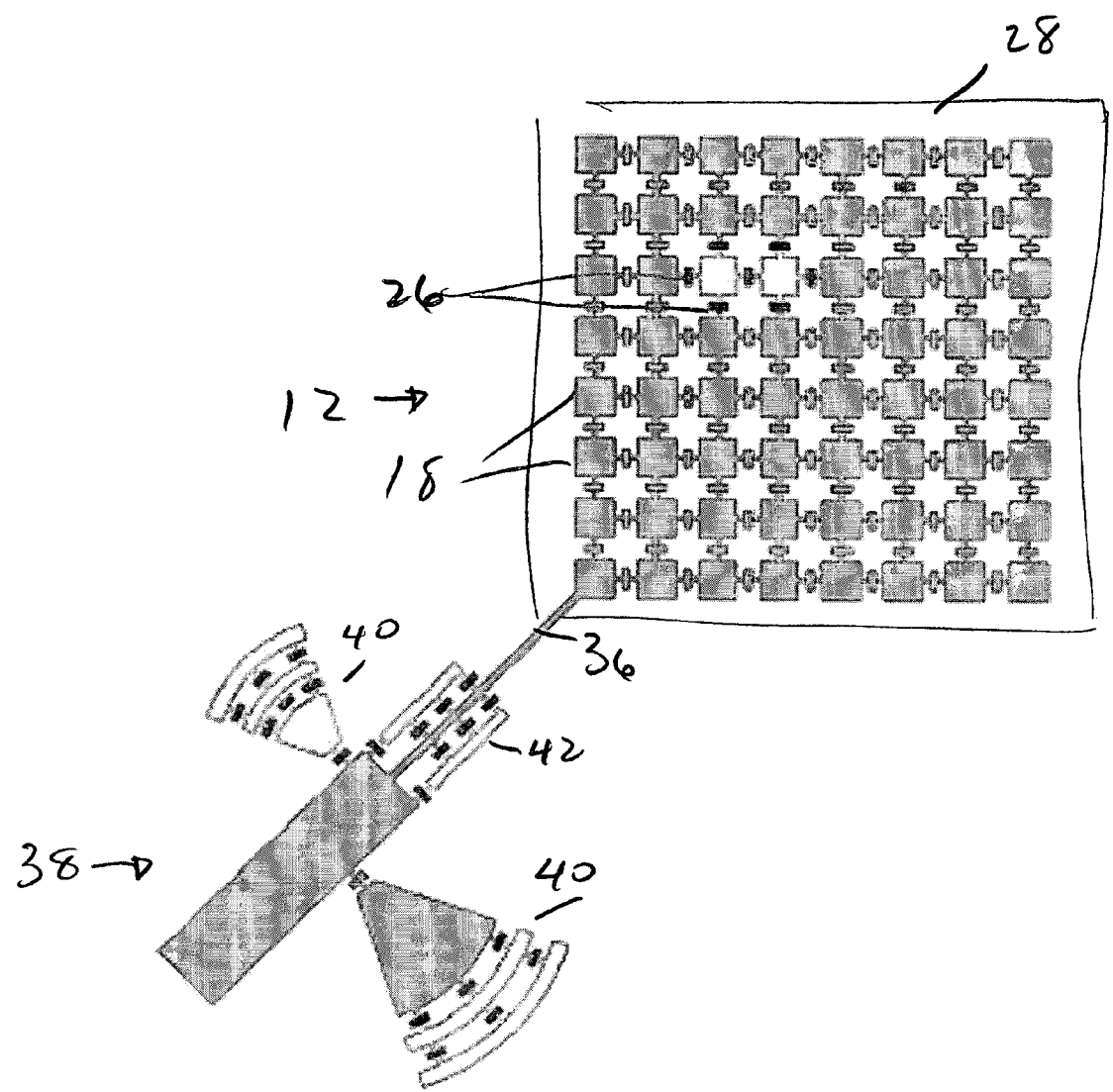
FIG. 5a is a schematic of a multifunctional reconfigurable pixel-patch antenna architecture arranged and configured for right hand circular polarization, $mode_{24}$, at 4.1 GHz.
Figure 5B:
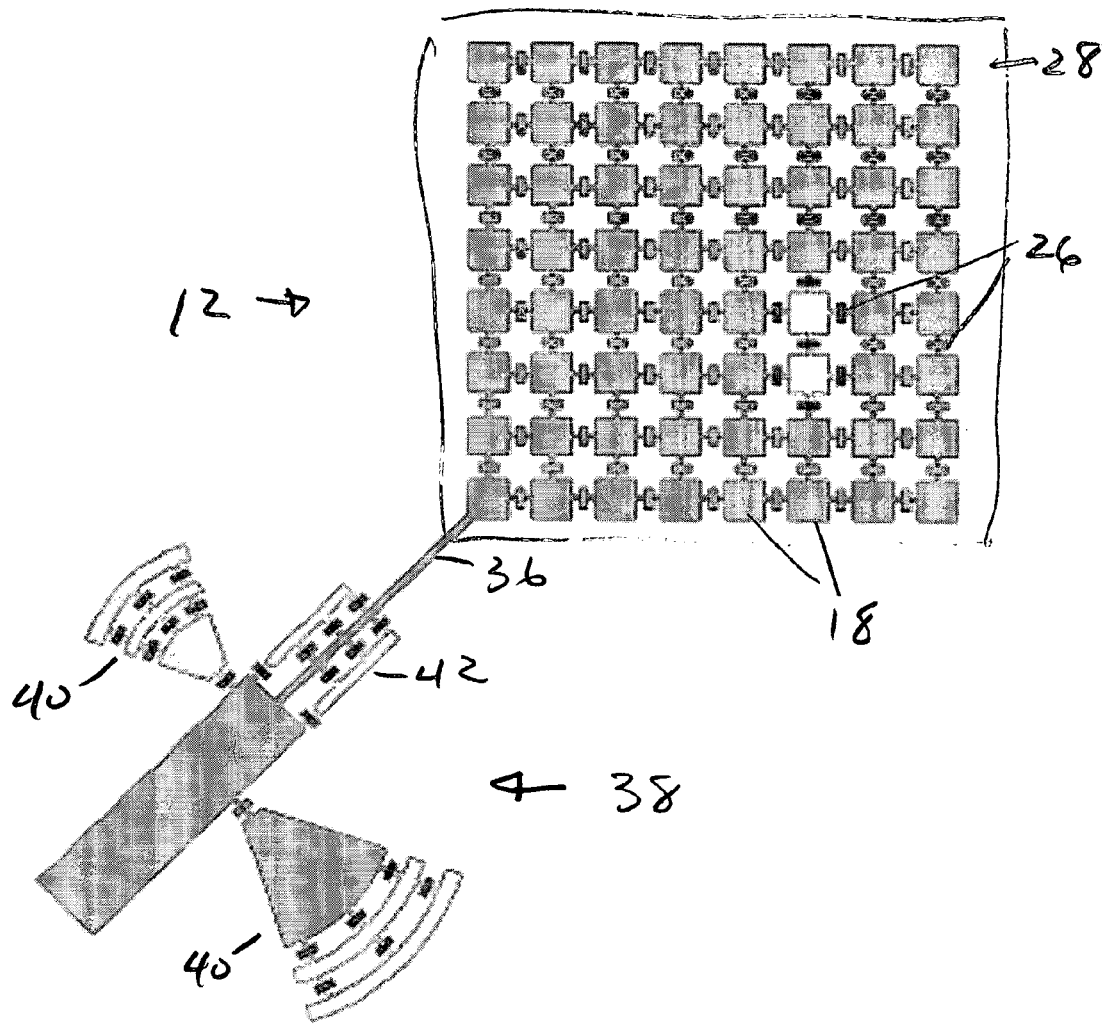
FIG. 5b is a schematic of a multifunctional reconfigurable pixel-patch antenna architecture arranged and configured for left hand circular polarization, $mode_{25}$, at 4.1 GHz.

The schematics corresponding to each polarization scenario, $mode_{24}$ and $mode_{25}$ for lower resonant frequency are depicted in FIG. 5a and FIG. 5b using selectively positioned holes 46. Operation modes corresponding to the higher resonant frequency are obtained in a similar manner and are not shown here, but can be readily determined by those having ordinary skill in the art based on the teachings of the invention. Note in each of the cases of FIGS. 3a-5b transformer 42 and stubs 40 are also altered to provide appropriate tuning of the feed.

Performance Characterization

As described above, the multifunctional reconfigurable antenna architecture comprised of a large number of metallic pixels 18 and interconnecting RF MEM actuators 26. It is clear that the fabrication of this complex structure is not feasible without employing monolithic integration, which is also the case for silicon-based MEMS technology. The fabrication calls for printed circuit board compatible MEMS technology described above.

In the illustrated embodiment we fabricated the simplified versions of the antenna geometry, where down state actuators were fabricated in the permanent down state position (fabricated down) and up state actuators were modeled by an open circuit. The influence of this simplification on the performance of the antenna 12 is negligible due to very low insertion loss and high isolation characteristics of RF MEMS actuators 26 used in the antenna structure 12.

We selected two modes of operation, mode 21 and mode 25, as examples for performance characterization. The antennas 12 were designed, fabricated, and tested. RO4003-FR4 ($\epsilon_r$=3.38, tan δ=0.002) microwave laminate was used as the substrate 28 due to its low cost and widespread use in wireless systems.

Figure 6A:
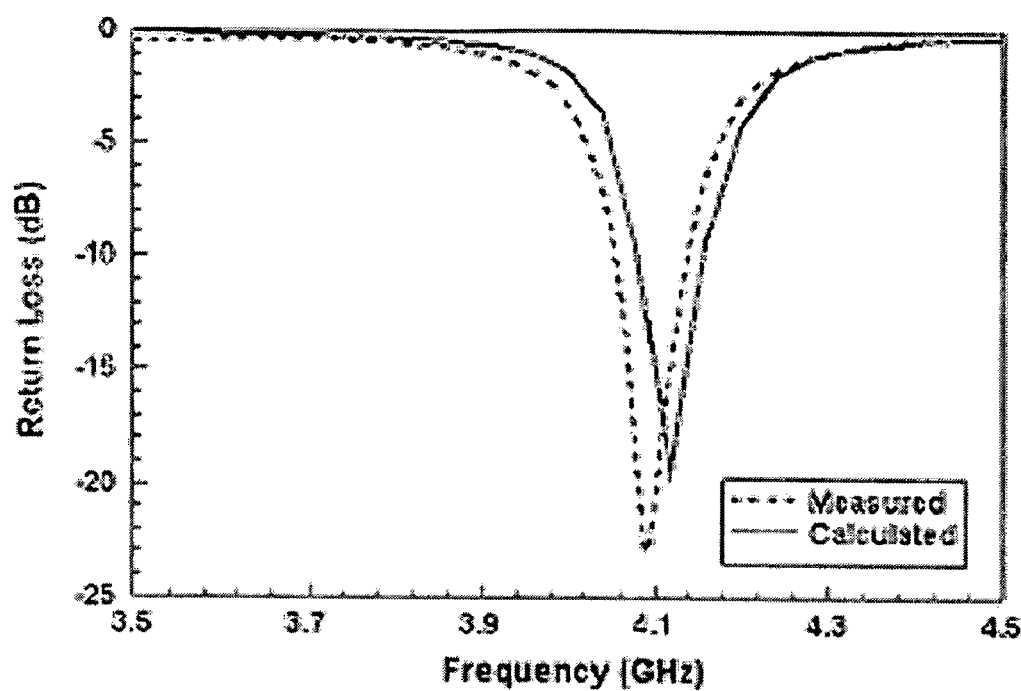
FIG. 6a is a graph of the measured and calculated return losses as a function of frequency for the antenna in $mode_{21}$ in Table I.
Figure 6B:
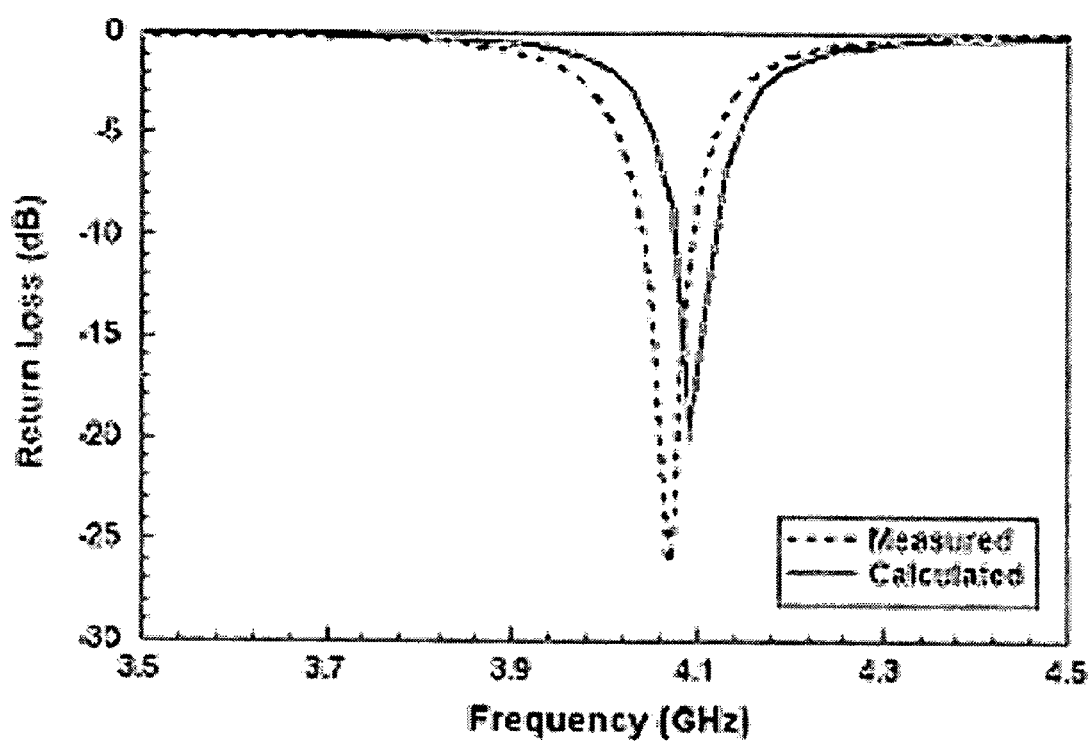
FIG. 6b is a graph of the measured and calculated return losses as a function of frequency for the antenna in $mode_{25}$ in Table I.

FIG. 6a and FIG. 6b show both theoretical and experimental results for the return losses and the radiation patterns of the antenna in mode 21, dual linear polarization lower frequency. Theoretical analyses with a full wave simulation were performed using a finite element method (FEM) tool. Very good agreement between simulated and measured results was observed. The behavior of the antenna 12 is very similar to that of conventional patch antenna with a bandwidth of 3% for a VSWR less than two.

Figure 6C:
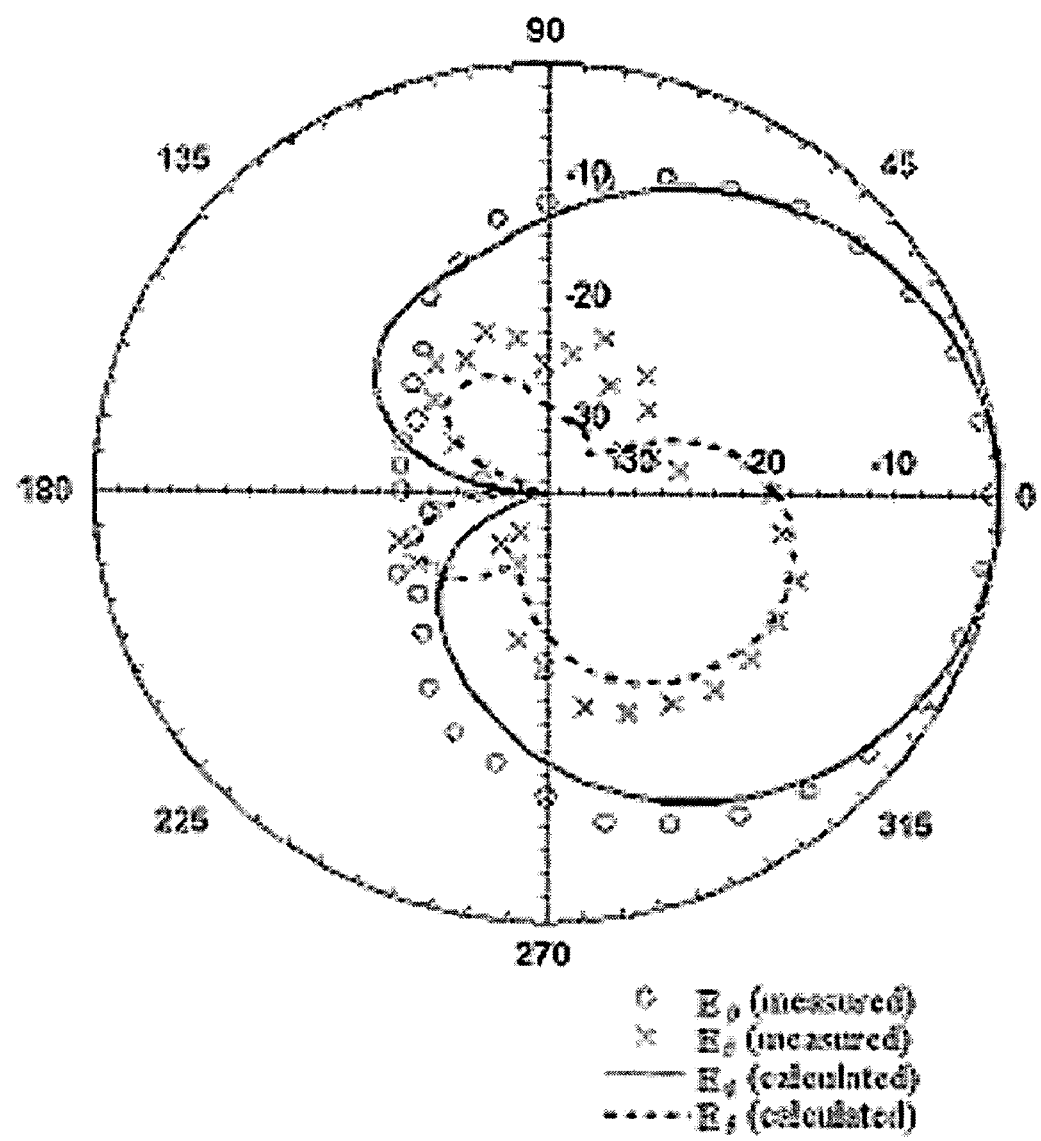
FIG. 6c is a graph of the measured and calculated radiation patterns for the antenna in x-z plane in $mode_{21}$ in Table I.
Figure 6D:
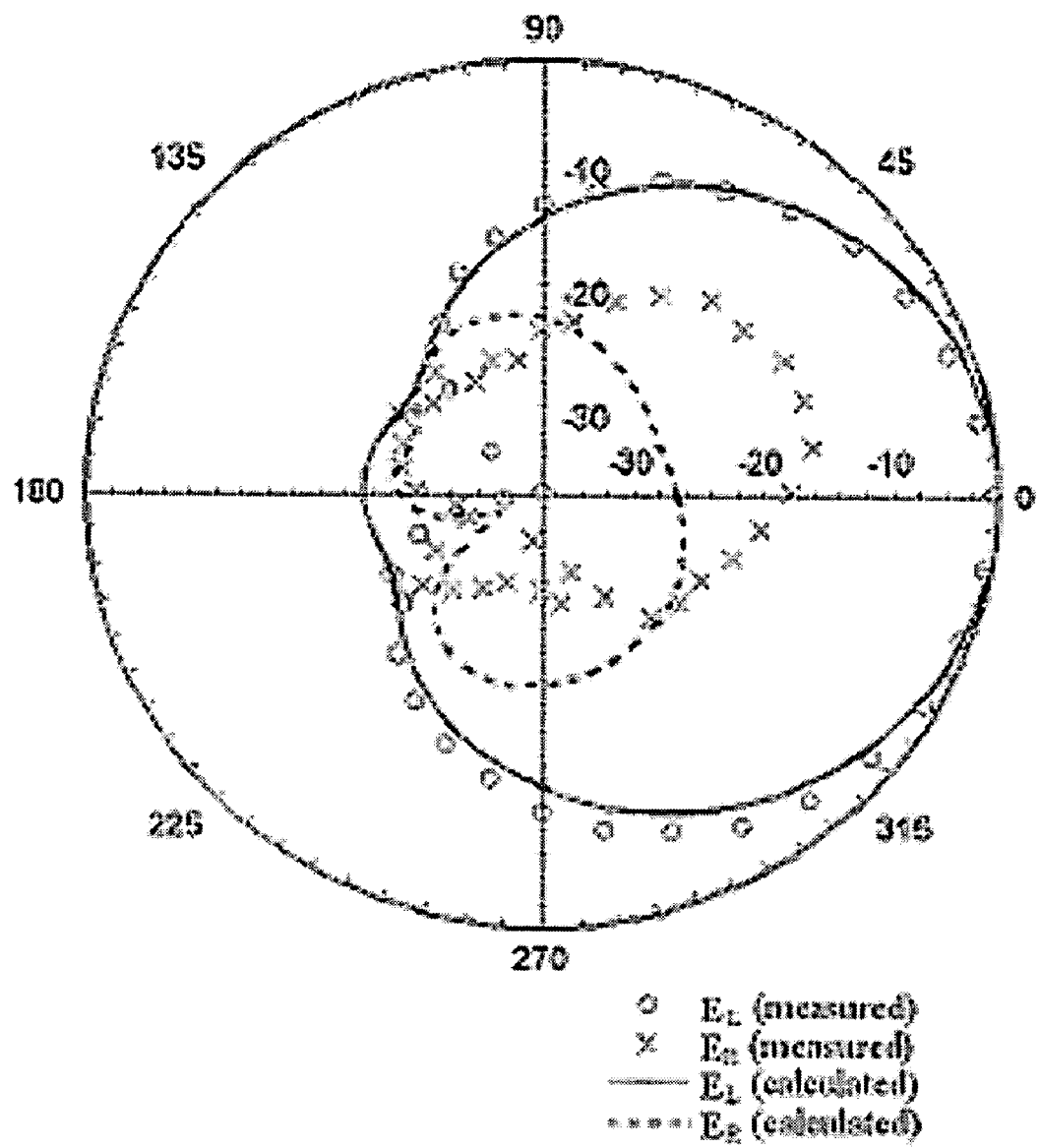
FIG. 6d is a graph of the measured and calculated radiation patterns for the antenna in x-z plane in $mode_{25}$ in Table I.

Results for mode 25, right-hand circular polarization lower frequency are given in FIG. 6c and FIG. 6d. As is seen from FIG. 6d, this antenna radiates a left hand circularly polarized wave normal to the plane of the antenna, in the +z-axis.

Figure 7:
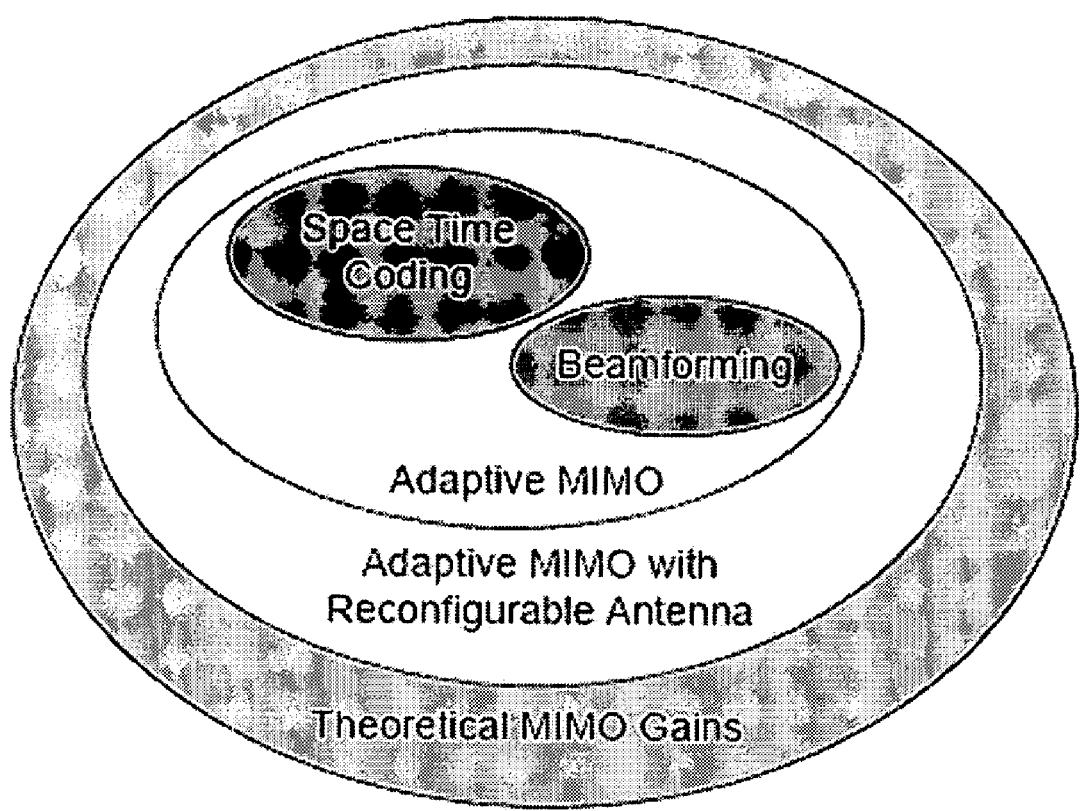
FIG. 7 is a diagram which illustrates how the multifunctional reconfigurable antenna of the invention integrated with space-time coding techniques to the propagation environment provides additional degree of freedom in adaptive optimization to close the gap between theoretical MIMO performance and practice.

It may now be appreciated that wireless applications that are increasingly bandwidth and mobility intensive have driven MIMO research to push against the physical limits of coding and signaling. The multifunctional reconfigurable antenna technology disclosed greatly impacts adaptive MIMO system design through the capability to change its radiation and impedance characteristics. The multifunctional reconfigurable antenna 12 integrated with space-time coding techniques to the propagation environment provides additional degree of freedom in adaptive optimization, and thus the gap between theoretical MIMO performance and practice is closed as symbolically illustrated by FIG. 7. A novel RF MEMS process that enables very large-scale monolithic integration of antenna and circuit components on common microwave laminates 28 is described. A simplified prototype of the multifunctional reconfigurable antenna is fabricated on a popular laminate and its multifunctional reconfigurable performances are found to be in good agreement with our simulation.

The creation by the invention of a long awaited design space where the interplay between multifunctional reconfigurable antennae 12 and adaptive coding can feed back to each other is likely to revolutionize broadband MIMO system design methodology.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in an adaptive MIMO communications system comprising;
    a multifunctional reconfigurable antenna array with a selectively alterable effective physical antenna array configuration and radiation/polarization properties, which configuration and properties is a component in the optimization of the adaptive system parameters, and
    a processing unit coupled to the multifunctional reconfigurable antenna to determine communication channel conditions for generating adaptive control signals to the plurality of selectively controllable switches,
    wherein the antenna communicates through a channel between a transmitter and a receiver, and where the processing unit generates adaptive control signals to the plurality of selectively controllable switches to utilize available partial channel information to dynamically change antenna behavior and provide the optimal performance in all cases to converge to space-time coding when the transmitter does not know the channel at all and to converge to beam forming when the transmitter knows the channel perfectly.

2. The improvement of claim 1 where the multifunctional reconfigurable antenna comprises a plurality of antenna components and a plurality of selectively controllable switches coupling selected ones of the plurality of antenna components together into a multifunctional reconfigurable subarray of antenna components.

3. The improvement of claim 2 where the antenna components comprise monopoles, dipoles, patches or combinations thereof.

4. The improvement of claim 2 further comprising a common substrate and where the switches comprise RF MEMS switches monolithically integrated on the common substrate with the antenna.

5. The improvement of claim 4 where the common substrate comprises a microwave laminate printed circuit board.

6. The improvement of claim 4 where the common substrate comprises a printed circuit board compatible with RF MEMS technology.

7. The improvement of claim 2 where the switch comprises an RF-MEM actuator and where the antenna components comprise pixel-patches of any geometric shape arranged in a pixel-patch antenna array in which two adjacent pixel patches are interconnected by the RF-MEM actuator, and where the RF-MEM actuator comprises a conductive movable membrane suspended over opposing and unconnected conductive stubs extending from adjacent pixel-patches in the array, so that when a voltage to applied between the membrane and the stub an electromagnetic force moves the suspended membrane into one of two electrical conduction states with the stub to selectively connect or disconnect the pixel-patches.

8. The improvement of claim 1 where the processing unit generates adaptive control signals to the plurality of selectively controllable switches to apply a selected beam forming protocol on the plurality of antenna components.

9. The improvement of claim 1 where the processing unit generates adaptive control signals to the plurality of selectively controllable switches to apply a selected transmission signaling scheme on the plurality of antenna components.

10. The improvement of claim 1 where the processing unit generates adaptive control signals to the plurality of selectively controllable switches to selectively apply a spatial multiplexing, selected space-time coding protocol or a selected beam forming protocol on the plurality of antenna components depending on channel conditions.

11. The improvement of claim 1 where the processing unit generates adaptive control signals to the plurality of selectively controllable switches to apply a selected radiation/polarization protocol on the plurality of antenna components according to transmission scheme or channel condition.

12. The improvement of claim 1 where the processing unit generates adaptive control signals to the plurality of selectively controllable switches to apply a selected optimized radiation/polarization protocol on the plurality of antenna components according to transmission scheme and channel condition.

13. The improvement of claim 12 where the antenna is characterized by a structural geometry and where the processing unit generates adaptive control signals to the plurality of selectively controllable switches to dynamically reconfigure the structural geometry of the antenna.

14. The improvement of claim 9 where the processing unit generates adaptive control signals to the plurality of selectively controllable switches to dynamically reconfigure the antenna radiation/polarization and frequency characteristics by altering the physical structure of the antenna.

15. The improvement of claim 1 where the antenna is characterized by frequency characteristics and where the processing unit generates adaptive control signals to the plurality of selectively controllable switches to alter the frequency characteristics of the antenna.

16. The improvement of claim 1 where the processing unit generates adaptive control signals to the plurality of selectively controllable switches to dynamically alter the antenna to optimally respond to changes in the propagation environment with changing multipath conditions.

17. The improvement of claim 1 where the multifunctional reconfigurable antenna is characterized by an array factor and element factor and where the processing unit generates adaptive control signals to the plurality of selectively controllable switches to selectively alter the array factor and the element factor of the multifunctional reconfigurable antenna.

18. The improvement of claim 1 where the processing unit generates adaptive control signals to the plurality of selectively controllable switches to selectively interrelate transmission algorithms, radiation/polarization characteristics of the multifunctional reconfigurable antenna, configuration of the multifunctional reconfigurable antenna, and propagation environment to optimize communication performance at all times.

19. The improvement of claim 1 where the processing unit generates adaptive control signals to the plurality of selectively controllable switches to selectively determine the number of antenna elements communicated to a corresponding transmission algorithm.

20. The improvement of claim 1 where the processing unit generates adaptive control signals to vary antenna element separation with geometric reconfigurability in the antenna.

21. The improvement of claim 1 where the processing unit generates adaptive control signals to alter operating frequency for space-frequency coding in MIMOorthogonal frequency-division multiplexing (MIMO-OFDM).

22. The improvement of claim 1 where the processing unit generates adaptive control signals according to multifunctional reconfigurable modes of operation characterized by a selected one or ones of a plurality of operating frequencies and characterized by a selected one or ones of a plurality of multifunctional reconfigurable polarizations of the radiated field.

23. The improvement of claim 22 where the antenna is characterized by an alterable architecture, and where the multifunctional reconfigurable modes of operation characterized by a selected one or ones of a plurality of operating frequencies is achieved by changing the architecture of the antenna.

24. The improvement of claim 1 in further combination with multiuser wireless networks including cellular mobile communication systems, wireless local area networks, mission-centric or individual-centric implementations of wireless ad-hoc networks, or sensor networks.

25. The improvement of claim 1 further comprising a plurality of multifunctional reconfigurable antennas selectively arranged and configured into a multifunctional reconfigurable antenna array.

26. The improvement of claim 1 further comprising a multifunctional reconfigurable feed circuit coupled to the antenna which is selectively controllable to dynamically match the antenna impedance depending on the modes of operation of the antenna.

27. The improvement of claim 26 where the multifunctional reconfigurable feed circuit comprises selectively controllable at least two radial stubs and a selectively controllable quarter-wave transformer.

28. The improvement of claim 27 further comprising a processing unit coupled to the multifunctional reconfigurable feed circuit to connect selected ones of the stubs and to selectively control the selectively connected radial stubs and quarter-wave transformer to achieve desired impedance matching for a targeted mode of operation.

29. An improvement in a method of operating an adaptive MIMO communications system comprising:
providing a multifunctional reconfigurable antenna,
selectively reconfiguring the multifunctional reconfigurable antenna with a selectively alterable effective physical antenna array and selectively alterable radiation/polarization properties to optimize adaptive system parameters; and
determining communication channel conditions, and generating adaptive control signals and communicating the control signals to the plurality of selectively controllable switches in response to the communication channel conditions,
wherein the antenna communicates through a channel between a transmitter and a receiver, and where generating adaptive control signals comprises applying adaptive control signals to the plurality of selectively controllable switches to utilize available partial channel information to dynamically change antenna behavior and provide the optimal performance in all cases to converge to space-time coding when the transmitter does not know the channel at all and to converge to beam forming when the transmitter knows the channel perfectly.

30. The improvement of claim 29 where the multifunctional reconfigurable antenna comprises a plurality of antenna components and a plurality of selectively controllable switches, and where selectively reconfiguring the multifunctional reconfigurable antenna comprises coupling selected ones of the plurality of antenna components together into a multifunctional reconfigurable subarray of antenna components.

31. The improvement of claim 30 where coupling selected ones of the plurality of antenna components together into a multifunctional reconfigurable subarray of antenna components comprises the antenna components comprise selectively coupling together monopoles, dipoles, patches or combinations thereof.

32. The improvement of claim 30 further comprising providing a common substrate and monolithically integrating the switches as RF MEMS switches on the common substrate with the antenna.

33. The improvement of claim 32 where providing the common substrate comprises providing a microwave laminate printed circuit board.

34. The improvement of claim 32 where providing the common substrate comprises providing a printed circuit board compatible with RF MEMS technology.

35. The improvement of claim 32 where the switch comprises an RF-MEM actuator and where the antenna components comprise a pixel-patch antenna array and further comprising interconnecting two adjacent pixel patches by the RF-MEM actuator, and where the RF-MEM actuator, which comprises a conductive movable membrane suspended over opposing and unconnected conductive stubs extending from adjacent pixel-patches in the array, by applying a voltage between the membrane and the stub so that an electromagnetic force moves the suspended membrane into one of two electrical conduction states with the stub to selectively connect or disconnect the pixelpatches.

36. The improvement of claim 29 where generating adaptive control signals comprises generating and applying a selected beam forming protocol to the plurality of antenna components.

37. The improvement of claim 29 where generating adaptive control signals comprises applying a selected space-time coding protocol to the plurality of antenna components.

38. The improvement of claim 29 where generating adaptive control signals comprises selectively applying a selected space-time coding protocol or a selected beam forming protocol to the plurality of antenna components.

39. The improvement of claim 29 generating adaptive control signals comprises applying a selected radiation/polarization protocol to the plurality of antenna components according to transmission scheme or channel condition.

40. The improvement of claim 29 where generating adaptive control signals comprises applying a selected optimized radiation/polarization protocol to the plurality of antenna components according to transmission scheme and channel condition.

41. The improvement of claim 40 where the antenna is characterized by a structural geometry and where generating adaptive control signals comprises applying adaptive control signals to the plurality of selectively controllable switches to dynamically reconfigure the structural geometry of the antenna.

42. The improvement of claim 41 where generating adaptive control signals comprises applying adaptive control signals to the plurality of selectively controllable switches to dynamically reconfigure the antenna radiation/polarization and frequency characteristics by altering the physical structure of the antenna.

43. The improvement of claim 29 where the antenna is characterized by frequency characteristics and where generating adaptive control signals comprises applying adaptive control signals to the plurality of selectively controllable switches to alter the frequency characteristics of the antenna.

44. The improvement of claim 29 where generating adaptive control signals comprises applying adaptive control signals to the plurality of selectively controllable switches to dynamically alter the antenna to optimally respond to changes in the propagation environment with changing multipath conditions.

45. The improvement of claim 29 where the multifunctional reconfigurable antenna is characterized by an array factor and element factor and where generating adaptive control signals comprises applying adaptive control signals to the plurality of selectively controllable switches to selectively alter the array factor and the element factor of the multifunctional reconfigurable antenna.

46. The improvement of claim 29 where generating adaptive control signals comprises applying adaptive control signals to the plurality of selectively controllable switches to selectively interrelate transmission algorithms, radiation/polarization characteristics of the multifunctional reconfigurable antenna, configuration of the multifunctional reconfigurable antenna, and propagation environment to optimize communication performance at all times.

47. The improvement of claim 29 where generating adaptive control signals comprises applying adaptive control signals to the plurality of selectively controllable switches to selectively determine the number of antenna elements communicated to a corresponding transmission algorithm.

48. The improvement of claim 29 where generating adaptive control signals comprises applying adaptive control signals to vary antenna element separation with geometric reconfigurability in the antenna.

49. The improvement of claim 29 where generating adaptive control signals comprises applying adaptive control signals to alter operating frequency for space-frequency coding in MIMO-orthogonal frequency-division multiplexing (MIMO-OFDM).

50. The improvement of claim 29 where generating adaptive control signals comprises applying adaptive control signals according to multifunctional reconfigurable modes of operation characterized by a selected one or ones of a plurality of operating frequencies and characterized by a selected one or ones of a plurality of multifunctional reconfigurable polarizations of the radiated field.

51. The improvement of claim 50 where the antenna is characterized by an alterable architecture, and where applying adaptive control signals according to multifunctional reconfigurable modes of operation comprises changing the architecture of the antenna.

52. The improvement of claim 29 where generating adaptive control signals comprises generating adaptive control signals for use in multiuser wireless networks including cellular mobile communication systems, wireless local area networks, mission-centric or individual-centric implementations of wireless ad-hoc networks, or sensor networks.

53. The improvement of claim 29 further comprising selectively reconfiguring a plurality of multifunctional reconfigurable antennas into a multifunctional reconfigurable antenna array.

54. The improvement of claim 29 further comprising providing a multifunctional reconfigurable feed circuit coupled to the antenna and selectively controlling the feed circuit to dynamically match the antenna impedance depending on the modes of operation of the antenna.

55. The improvement of claim 54 where selectively controlling the multifunctional reconfigurable feed circuit comprises selectively controlling at least two radial stubs and a quarter-wave transformer.

56. The improvement of claim 55 where generating adaptive control signals comprises connecting selected ones of the stubs and to selectively controlling the selectively connected radial stubs and quarter-wave transformer to achieve desired impedance matching for a targeted mode of operation.

* * * * *